United States Patent
Camenisch

(10) Patent No.: US 8,856,524 B2
(45) Date of Patent: Oct. 7, 2014

(54) CRYPTOGRAPHIC METHODS, HOST SYSTEM, TRUSTED PLATFORM MODULE, COMPUTER ARRANGEMENT, COMPUTER PROGRAM PRODUCT AND COMPUTER PROGRAM

(75) Inventor: Jan Leonhard Camenisch, Ruschlikon (CH)

(73) Assignee: International Business Machines Corporation, Armonk, NY (US)

( * ) Notice: Subject to any disclaimer, the term of this patent is extended or adjusted under 35 U.S.C. 154(b) by 2504 days.

(21) Appl. No.: 11/541,017

(22) Filed: Sep. 29, 2006

(65) Prior Publication Data
US 2007/0101138 A1    May 3, 2007

(30) Foreign Application Priority Data
Sep. 29, 2005  (EP) ...................... 05021352

(51) Int. Cl.
*H04L 29/00* (2006.01)
*H04L 9/32* (2006.01)

(52) U.S. Cl.
CPC ............ *H04L 9/3234* (2013.01); *H04L 9/3247* (2013.01); *H04L 2209/42* (2013.01); *H04L 9/3263* (2013.01)

USPC ............ 713/168; 713/155; 713/172; 713/176

(58) Field of Classification Search
USPC .................................. 713/155, 168, 172, 176
See application file for complete search history.

(56) References Cited

U.S. PATENT DOCUMENTS

| | | | |
|---|---|---|---|
| 7,058,807 B2 * | 6/2006 | Grawrock et al. | 713/172 |
| 2004/0205341 A1 * | 10/2004 | Brickell | 713/168 |
| 2005/0149722 A1 * | 7/2005 | Wiseman et al. | 713/155 |
| 2006/0129824 A1 * | 6/2006 | Hoff et al. | 713/176 |

* cited by examiner

*Primary Examiner* — Jeffrey Pwu
*Assistant Examiner* — Michael D Anderson
(74) *Attorney, Agent, or Firm* — William Stock; Anne Vachon Dougherty

(57) ABSTRACT

A cryptographic method is provided for a host system having an associated trusted platform module. A first contribution to a message is computed by the TPM based on a first secret parameter stored in the TPM. The host system computes a second contribution to the message based on a second secret parameter stored in the host system outside the TPM. The first and second contributions to the message are then combined by either the host or the TPM and a first proof is conducted, proving to the host system that the contribution of the TPM was computed correctly or proving to the TPM that the contribution of the host was computed correctly.

20 Claims, 4 Drawing Sheets

CRYPTOGRAPHIC METHODS, HOST SYSTEM, TRUSTED PLATFORM MODULE, COMPUTER ARRANGEMENT, COMPUTER PROGRAM PRODUCT AND COMPUTER PROGRAM

TECHNICAL FIELD

The present invention relates to a cryptographic method for computing a message using a host system comprising a trusted platform module. In addition, the invention relates to a cryptographic method for computing a signature using a host system and a trusted platform module. Moreover, the invention relates to a host system, a trusted platform module, a computer arrangement, a computer program product and a computer program adapted to perform such methods.

BACKGROUND OF THE INVENTION

Increasing interest and demand in performing transactions electronically over a data network, particularly over the Internet, has created a demand for secure electronic communication. For a transaction to be secure, e.g., an online purchase or an electronic banking transaction, messages exchanged between two parties should remain private and originate from a trusted source. The first issue can be addressed by data encryption, for example using symmetric or asymmetric keys known only to the sender and receiver of a secret message.

The second issue can be addressed by message signing, for example using asymmetric public key signing algorithms, in which a sender of a message generates a signature using a private key on a message to be verified, while everybody receiving the message can verify its authenticity by means of an associated public key.

In some situations, however, a sender of a message wants to remain anonymous with respect to a receiver or verifier of a message while still proving that he or she possesses the required authorization for a particular operation.

For example, a user of a computer system may want to prove that he or she is running a secure operating system in order to be granted access to a closed network, e.g., a company internal local area network (LAN or intranet). Another example would be a user belonging to a certain group, e.g., a subscriber of a particular website, that wants to prove membership before he or she is granted access to resources on this website without disclosing his or her identity.

In order to achieve such and similar goals, the Trusted Computing Group (TCG) has designed a framework for allowing trusted computing. An important part of this framework are so-called trusted platform modules (TPM), which are hardware chips integrated into a computer system and which allow, among other things, secure storage of encryption keys and performing of cryptographic operations. The TPMs operate in a black-box fashion, i.e., the host into which a TPM is integrated cannot manipulate its mode of operating. This protects the TPM, for example in case the platform is infected by some malicious software, also known as viruses.

The framework together with the associated TPMs is described in more detail in two documents titled "TCG Specification Architecture Overview, Specification, Revision 1.2" and "TCG Infrastructure Working Group Reference Architecture for Interoperability (Part I), Specification Version 1.0, Revision 1" by the Trusted Computing Group, Incorporated available at https://www.trustedcomputinggroup.org/downloads/specifications/specifications.

A protocol supported by the current TCG specification is the so-called direct anonymous attestation (DAA) protocol which allows a host comprising a TPM to prove to a verifier, e.g., some service provider, that it possesses a certification of an issuer without either disclosing the certificate or its own identity. The mathematical background and implementation of this protocol is described in a paper by Brickell, Camenisch and Chen, titled "Direct Anonymous Attestation" presented at the 2004 ACM Conference on Computers and Communications Security.

In a nutshell, the direct anonymous attestation scheme works as follows. A TPM chooses a secret parameter, obtains a signature, called attestation in the context of this application, on it from an issuer via a secure two-party protocol, and then can convince a verifier that it got attestation anonymously by a proof of knowledge of attestation. To allow the verifier to recognise rogue TPMs, a TPM must also provide a pseudonym and a proof that the pseudonym is formed correctly, i.e., that it is derived from the TPM's secret parameter used in the attestation procedure and a base determined by the verifier.

More specifically, the TPM integrated into a host platform generates a first pseudonym $N_I$ for communication with the issuer based on the issuer's public key $PK_I$ and secret parameters $f_0$ and $f_1$ generated by the TPM. The TPM further computes a message U based on the same secret parameter. The TPM then authenticates the so-called direct attestation key (DAA key) comprising these two parts with an endorsement key EK also stored securely inside the TPM.

In order to obtain certification, the TPM proves to an external issuer, for example a network service provider or manufacturer of the TPM, that is possesses knowledge of the secret parameters $f_0$ and $f_1$ that have contributed to the generation of the DAA key without disclosing the secret parameters itself.

The issuer verifies the proof and the endorsement key EK of the TPM, for example using black- or white lists, listing valid or rogue TPMs respectively. If the issuer is convinced that the DAA key was generated by a valid TPM, it generates a certificate (A, e) that can be used to prove that the TPM possesses attestation for this particular DAA key by the issuer identified with the associated $PK_I$. The key generation and subsequent certification by an issuer is also referred to as the join protocol.

In a further protocol, called the sign protocol, the TPM generates a further asymmetric key, called the attestation identity key (AIK) for communication with a verifier. The TPM then generates a signature σ on the AIK using the secret parameters $f_0$ and $f_1$ and the certificate (A, e) and transmits the signature σ and the AIK to the verifier.

In order to remain anonymous, the TPM does not sign the AIK using its endorsement key EK or uses the pseudonym $N_I$ used for communication with the issuer but uses second pseudonym $N_V$ for communication with the verifier. The pseudonym $N_V$ contains a contribution based on the secret parameters $f_0$ and $f_1$ stored inside the TPM and may contain a contribution based on a public key $PK_V$ of the verifier. In this way, the TPM can generate different pseudonyms for different AIKs without allowing verifiers to link these keys to one another, thus remaining anonymous.

The signature σ effectively constitutes a proof of the host to the verifier that its TPM possesses knowledge of the certificate on its secret part of the DAA key. Again, neither the key nor the secret parameters $f_0$ and $f_1$ used in its generation are disclosed. Finally, the verifier verifies that the signature σ on the AIK is valid and was computed based on the knowledge of the certificate (A, e) and the secret parameters $f_0$ and $f_1$.

However, due to its black-box implementation, users do not necessarily trust the TPM itself. Many are particularly concerned about so-called trapdoor functions, integrated into the TPM, for example, by the manufacturer or authorities such as a secret service. Such trapdoor functions could allow identification of the source of what purports to be an anonymous message.

Consequently, there exists a need for improved cryptographic methods in general and cryptographic methods for generating and using anonymous attestation keys in particular.

SUMMARY OF THE INVENTION

According to one aspect of the invention, a cryptographic method for computing a message is provided.

A host system with a trusted platform module (TPM) is provided. The TPM and the host system itself compute a first and second contribution to a message based on a first and second secret parameter, respectively. Then, one of the parties combines the two contributions to a combined message and the other conducts a first proof, proving to the first party that the other party's contribution was computed correctly.

Because the computation is split between two parties, they must collaborate whenever knowledge of the secret parameters used to compute the combined message is required.

According to a preferred embodiment of the first aspect, the host and TPM are provided with a public key of an issuer. The correctness of the other party's contribution is then proved by proving that the contribution lies in a subgroup defined by at least a part of the public key of the issuer.

In this way the combined message cannot contain any hidden information encoded into the other party's contribution, by deliberately leaving the subgroup it is supposed to lie in.

According to a further preferred embodiment of the first aspect, the host system combines the first and second message contributions and the TPM conducts the first proof. In addition, a pseudonym for communication with an issuer is computed based on the same two secret parameters. In a second proof, it is proved to the TPM that the pseudonym was computed correctly. The TPM then authenticates the pseudonym with a secret endorsement key stored within in, if it accepts the second proof. At last, the authenticated pseudonym and the combined message are made available through the host, if the host accepts the first proof.

Due to this procedure, neither the TPM nor the host can complete the method without convincing the other party that it computed its own contributions correctly.

According to a further preferred embodiment of the first aspect, the computation of the pseudonym is based on a basis selected by the host system and based on a public key received from an issuer. Both contributions to the pseudonym are based on exponential functions with the basis selected by the host and the first and second parameters used as exponent respectively. The two contributions are then combined by the host system to form the pseudonym.

Because it is computationally expensive to compute a discrete logarithm, the secret parameters used for computing the contributions cannot be easily discovered.

According to a further preferred embodiment of the first aspect, the second proof comprises the proof that the host in combination with the TPM possesses knowledge of the first and second parameter.

In this way, the TPM can be convinced that its contribution to the pseudonym was used in the computation of the combined pseudonym. In consequence, the host cannot use the combined pseudonym without the collaboration of the TPM.

According to a further preferred embodiment of the first aspect, the authenticated pseudonym and the combined message are transmitted to an issuer for verification and certification. For this, in a third proof, the host system and the TPM prove collectively to the issuer, that the message and the pseudonym were computed correctly. If the issuer accepts the proof, it issues a certificate on the pseudonym and transmits it back to the host system. Then, a part of the certificate is decoded and stored by the host system and another part is decoded and stored by the TPM.

Because the initial computation of the pseudonym and the message was split between the host and the TPM, they can only prove the correctness of the two parameters in collaboration. As using the certificate issued requires knowledge of the secret parameters underlying the pseudonym and the message, the certificate can only be used, if both parties collaborate.

According to a further preferred embodiment of the first aspect, the third proof comprised two parts. The first part consists of verifying that a valid endorsement key was used to authenticate the pseudonym. The second part comprises proving knowledge of the secret parameters used for the computation of the pseudonym and the message to the issuer.

Because it is computationally expensive to compute a discrete logarithm, the secret parameters used for computing the contributions cannot be easily discovered.

According to a further preferred embodiment of the first aspect, the second proof comprises the proof that the host in combination with the TPM possesses knowledge of the first and second parameter.

In this way, the TPM can be convinced that its contribution to the pseudonym was used in the computation of the combined pseudonym. In consequence, the host cannot use the combined pseudonym without the collaboration of the TPM.

According to a further preferred embodiment of the first aspect, the authenticated pseudonym and the combined message are transmitted to an issuer for verification and certification. For this, in a third proof, the host system and the TPM prove collectively to the issuer, that the message and the pseudonym were computed correctly. If the issuer accepts the proof, it issues a certificate on the pseudonym and transmits it back to the host system. Then, a part of the certificate is decoded and stored by the host system and another part is decoded and stored by the TPM.

Because the initial computation of the pseudonym and the message was split between the host and the TPM, they can only prove the correctness of the two parameters in collaboration. As using the certificate issued requires knowledge of the secret parameters underlying the pseudonym and the message, the certificate can only be used, if both parties collaborate.

According to a further preferred embodiment of the first aspect, the third proof comprised two parts. The first part consists of verifying that a valid endorsement key was used to authenticate the pseudonym. The second part comprises proving knowledge of the secret parameters used for the computation of the pseudonym and the message to the issuer.

By verifying that a valid endorsement key was used for authenticating the pseudonym, the issuer can be sure that a known TPM was involved in the process, i.e., that the received pseudonym originates from a trusted platform. By verifying that both the message and the pseudonym were computed based on the same secret parameters, the issuer knows that the message also contains a contribution from the TPM.

According to a second aspect of the present invention, a host system is provided which comprises a TPM and an anonymous attestation key, attestation key comprising a first and second parameter, a first pseudonym and a certificate by an issuer, wherein at least the first parameter is stored inside the TPM and at least the second parameter is stored outside the TPM. Based on the two secret parameters, a second pseudonym for communication with a verifier is computed. In addition, a signature message based on a first signature parameter of the TPM and a second signature parameter of the host is computed. In a fourth proof the TPM proves to the host that a first contribution based on the first signature parameter was computed correctly by the TPM. Then, a signature for a message is computed, based on the second pseudonym and the signature message. Finally, the signature is made available by the host, if it accepts the fourth proof as correct.

Because the signature of the message generated in this method is based on a second pseudonym, it cannot be easily linked to the first pseudonym. In addition, neither the host nor the TPM can compute the second pseudonym on their own, as it is based on the same secret parameters used for the first pseudonym. By also splitting the computation of the signature message between the two parties, neither party can sign a message without the other party's consent.

According to a preferred embodiment of the second aspect, the computation of the second pseudonym comprises the selection of a basis for the computation of exponential function by the host and computation of a first and second contribution with the first and second signature parameters as basis by the TPM and host respectively. The contributions are then combined to form the second pseudonym by the host system.

As above, the use of exponential functions ensures that the signature parameters cannot be easily recovered.

According to a further preferred embodiment of the second aspect, the computation of the signature message is split into several parts. At first, a first signature part is computed. Based on the first part, a challenge is computed. Finally, a second signature part based on this challenge is computed.

The three parts of the signature message correspond to cryptographic methods, wherein the first signature part is used as a proof commitment message and the second signature part is used as a response message in a challenge response mechanism. Thus, different cryptographic methods working in accordance with the challenge response principle can be used by the embodiment.

According to a further preferred embodiment of the second aspect, the computation of the first signature part is split into computation of a first and second contribution based on the first and second signature parameter by the TPM and the host, respectively. The two contributions are then combined by the host system.

As above, the splitting of the computation makes sure that both parties must contribute to the first signature part.

According to a further preferred embodiment of the second aspect, the step of conducting the fourth proof comprises that a public key of an issuer is provided to the TPM and the host and showing that the first contribution to the first signature part lies in a subgroup defined by at least part of the public key.

As above, this makes sure that the TPM cannot encode any hidden message into the first part of the signature message by deliberately leaving a subgroup defined by the issuer's public key.

According to a further preferred embodiment of the second aspect, the message and the signature on it are transmitted to a verifier, which verifies the correctness of the signature.

Only if the signature is correct with respect to the message does the verifier accept the message to be authentic.

By verifying the signature, the verifier can be sure that the message was not tampered with, i.e., is authentic.

According to a further preferred embodiment of the second aspect, the signature comprises values, which together comprise a proof, proving that the second pseudonym is based on the same secret parameters as the first pseudonym and that the host and TPM together possess knowledge of a certificate on the first pseudonym.

This proof allows a verifier to verify that the host system, which generated it, possesses certification from an issuer. Combination of all data required for performing the proof into the signature also makes the protocol more efficient by avoiding exchange of multiple messages between the host system and the verifier.

According to a third aspect of the invention, a host system is provided, which comprises a TPM with a first memory and first processing unit. The host system itself further comprises a second memory and a second processing unit outside the TPM. The first and second processing units are configured to compute a first and second contribution to a message based on a first and second parameter stored in the first and second memory respectively. At least one of the processing units is further configured to combine the first and second contributions, while at least the other processing unit is configured to prove to the one processing unit that it computed its own contribution correctly.

As above, the computation is split between two parties, so that the TPM and the host must collaborate whenever knowledge of the secret parameters used to compute the combined message is required.

According to a preferred embodiment of the third aspect, the first and second processing units are adapted to generate a first and second random number. The first and second random numbers are used as first and second secret parameters.

By using random numbers as secret parameters, the resulting message is non-deterministic, which prevents an outside party from determining the secret parameters.

According to a further preferred embodiment of the third aspect, the host system is adapted to generate an asymmetric key pair for encryption or authentication, whereby the combined message forms at least part of a public part of the key and the first and second secret parameter form at least a part of a private part of the key.

By using the described apparatus to generate asymmetric key pairs, it can be used in combination with many existing asymmetric cryptographic methods.

According to a further preferred embodiment of the third aspect, the host system is adapted to perform any of the methods executed by the host system according to the first and second aspect of the invention.

In accordance with a fourth aspect of the invention, a TPM is described, which comprises a processing unit, a memory and an interface to a host system. The processing unit is adapted to compute a contribution to a message based on a parameter stored in the memory and to transmit the contribution to the host system via the interface. It is further adapted to prove to the host that the contribution was computed correctly.

According to a preferred embodiment of the fourth aspect, the processing unit is further adapted to compute a contribution to a pseudonym based on the same secret parameter and to transmit this contribution to the host system. The processing unit is further adapted to request and verify a proof, proving that the contribution previously computed has contributed to a pseudonym received from the interface.

According to a fifth aspect of the invention, a computer arrangement is provided that comprises a host with a built-in TPM, an issuer, a verifier and communication links between the host, the issuer and the verifier. The computer arrangement is adapted to perform a cryptographic method according to the first or second aspect of the present invention.

The described computer arrangement thus enables secure and anonymous communication between the host and the verifier using the issuer.

According to a sixth aspect of the invention, a computer program product comprising a computer readable medium embodying a program of instructions executable by a host system is provided. The program instructions request a first contribution to a message from a TPM, verify the correctness of the first contribution and compute a second contribution based on a secret parameter chosen by the program. Finally the two contributions are combined to form a common message and to make the message available, if the verification was successful.

According to a preferred embodiment of the sixth aspect, the computer program product further includes program instructions to request a first contribution to a pseudonym from the TPM and to compute a second contribution based on the secret parameter. Then, the two contributions are combined to form a pseudonym. Finally, there are instructions to prove to the TPM that the first contribution has contributed to the combined pseudonym.

According to a seventh aspect of the invention, a computer program comprising program instruction adapted to perform all the steps performed by a host system according to the first and second aspect is disclosed.

Further details and embodiments of the present invention are described in the patent claims.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings wherein.

DETAILED DESCRIPTION OF THE DRAWINGS

Figure 1:
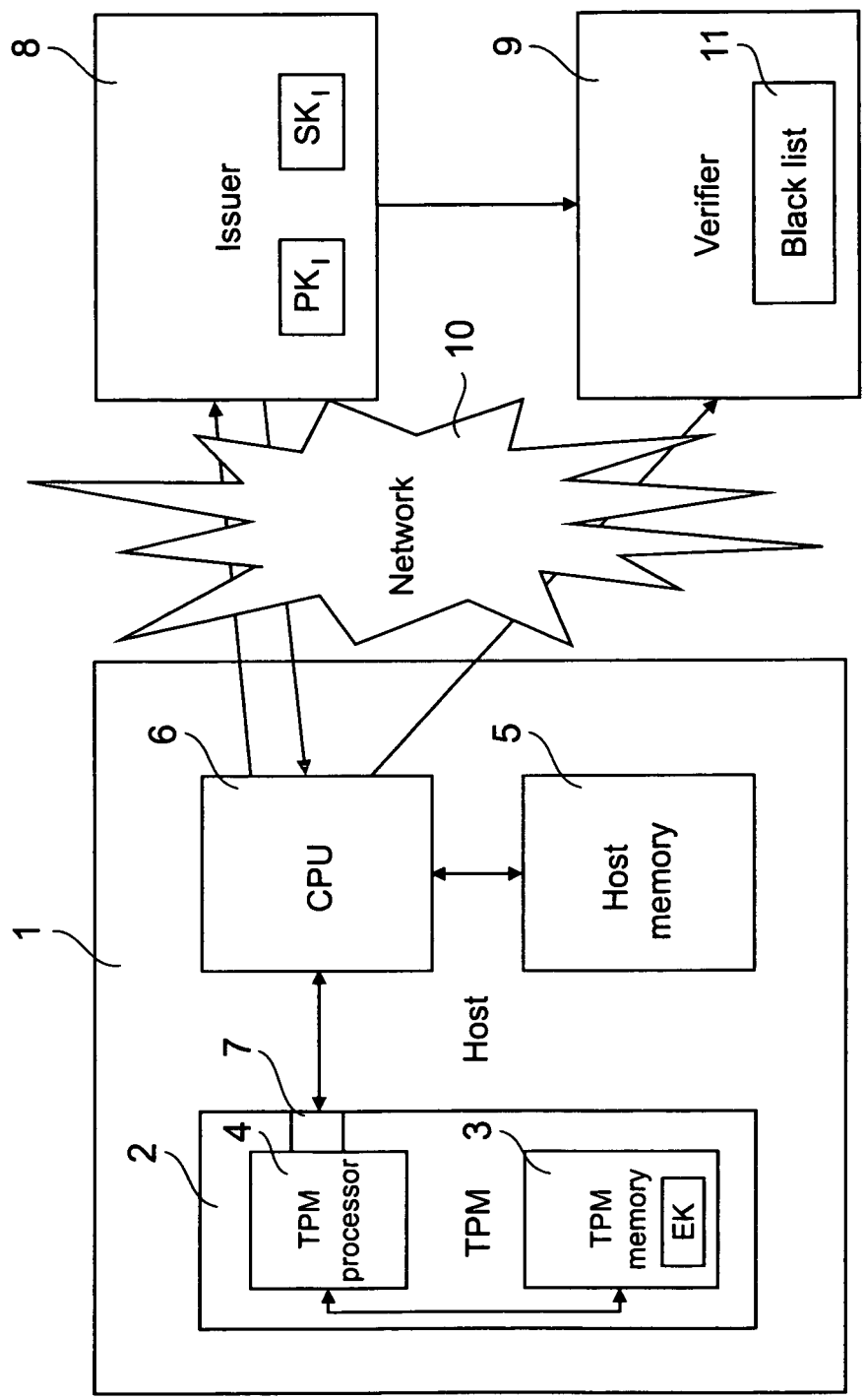
FIG. 1 illustrates a computer arrangement configured to perform an embodiment of an inventive method.

FIG. 1 shows a computer arrangement comprising a host system 1, an issuer 8 and a verifier 9. The host system 1 comprises a trusted platform module (TPM) 2 with an internal, secure memory 3, and an internal processing unit 4. The host system 1 further comprises its own memory 5 and processing unit 6. The memory 3 of the TPM 2 comprises a unique endorsement key EK.

Typically the processing unit 4 of the TPM 4 is a purpose designed hardware unit allowing it to perform cryptographic operations such as key generation, encryption and decryption. The processing unit 6 of the host system 1 can be an all-purpose processing unit, for example the central processing unit (CPU) of the host system 1.

The processing unit 6 of the host system 1 and the TPM 2 can only communicate over a limited interface 7. Particularly, the processing unit 6 cannot access or manipulate values stored inside the secure memory 3 of the TPM 2. However, the TPM 2 can perform measurements on the host system 1 concerning the integrity of the host system 1, e.g., check whether a particular operating system is running on the host system or not.

The host system 1 is connected to the issuer 8 and verifier 9 by means of a data network 10. The internal structure of the issuer 8 and the verifier 9 may be identical to the set-up of the host system 1 but may also be of some other suitable kind known to the person skilled in the art. In particular, the issuer 8 and verifier 9 might or might not comprise a trusted platform module of their own in order to perform cryptographic operations and prove their authenticity to the host system 1 and each other. However, it is to be noted that this is optional. For example, the issuer 8 and verifier 9 can implement the required operations using a software program running on an all-purpose processor.

The data network 10 might be an open network, such as the Internet, or a closed network, such as a company internal local area network (LAN). It does not have to be secure in order to maintain the robustness of the inventive method.

The issuer 8 comprises an asymmetric key pair comprising a private key $SK_I$ and a public key $PK_I$. The public key $PK_I$ is readily available over the data network 10 to the host system 1 and the verifier 9, whereas the private key $SK_I$ is stored securely by the issuer 8. The verifier 9 comprises a black list 11 of rogue TPMs, which can be assembled internally, provided by the issuer 8 or another computer system in the data network 10, which is not shown in FIG. 1.

FIG. 1 shows a simple computer arrangement comprising a single host system 1, an issuer 8 and a verifier 9. In practice, however, the number of host systems 1, e.g., user computers, will be large as well as the number of verifiers 9, e.g., service providers. Conceptually, there is no need for more than one issuer 8. However, multiple issuers can be used, e.g., in order to prevent a performance bottleneck. For example, the manufacturer of the TPM 4 might provide a first issuer on the Internet, while the operator of a company internal network might provide a second issuer for use within that network.

Figure 2:
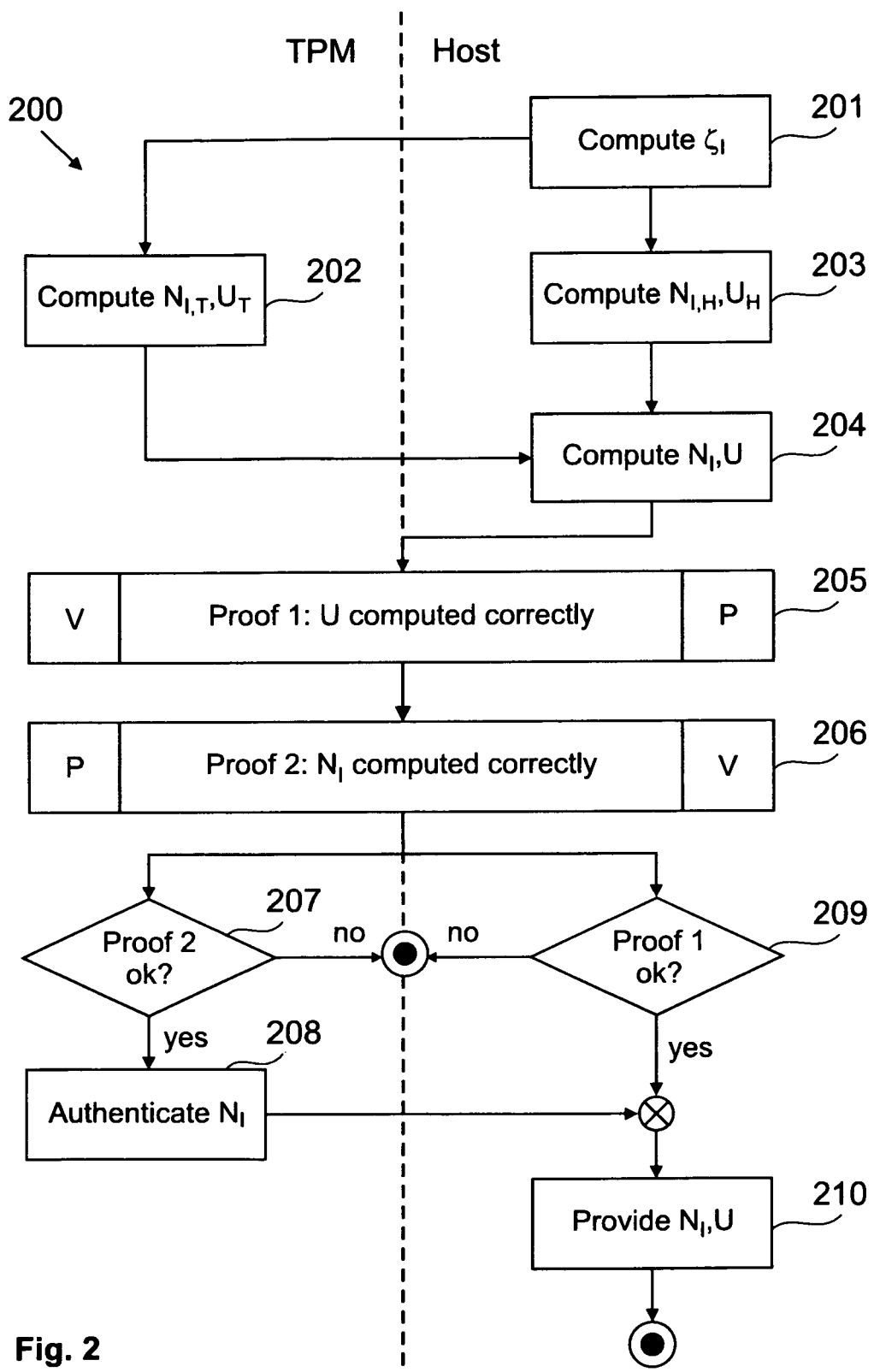
FIG. 2 provides a flowchart of a method for key generation in accordance with an embodiment of the present invention.

FIG. 2 shows a flow chart of a method for generating DAA keys in accordance with one embodiment of the invention. The key generation is a process performed jointly by the host system 1 and the TPM 2. Whereas at least part of the security critical operations, such as signing messages with the secret endorsement key EK, are performed by the processor 4 of the TPM 2, other operations, in particular less security critical operations and all input/output operations from and to the network 10, are performed by the processor 6 of the host system 1.

In FIG. 2 all operation performed by the TPM are shown on the left, while operations of the host are shown on the right. It should be noted, however, that some operations could be performed by either party, and that others, like proving the correctness of some computation, can only be performed jointly by both parties.

The required operations can be implemented either in hardware alone or as a combination of hardware and software. A computer readable medium may be provided embodying program instructions executable by one or a combination of the devices of the computer arrangement shown in FIG. 1. The computer readable medium may for example be a CD-ROM, a flash memory card, a hard disc or any other suitable computer readable medium.

The objective of the key generation process is to compute a message U and a pseudonym $N_I$ such that an issuer 8 can be convinced that the pseudonym $N_I$ was authenticated using a valid endorsement key EK of a TPM 2. In order to do so, U and $N_I$ have to be computed based on a common secret parameter f, to which the TPM 2 has contributed, i.e., has part knowledge of.

To guarantee the anonymity and privacy of the host system 1, the host system 1 needs to be sure that the TPM 2 cannot encode any hidden information into the message U or the pseudonym $N_I$. This can be achieved by making sure that, first, the parameter f is chosen at random, and, second, that the message U is part of a subgroup <S> generated by a part of the public key $PK_I$ of the issuer 8.

Maintaining the security provided by the TPM 2 and at the same time guaranteeing anonymity to the host system 1, even in case of a rogue TPM 2, may be obtained by splitting the parameter f into two parts, a first part $f_T$ being contributed by the TPM 2, and a second part $f_H$ being contributed by the host system 1. If at least one of these parameters is chosen at random, i.e., if at least one party does not cheat, the parameter f based on a combination of these parameters is guaranteed to be random as well.

In practice it suffices, if the TPM 2 cannot cheat, i.e., encode secret information into the message U or the pseudonym $N_I$ to be created, because the host system 1 can always disclose its identity to another system, like a verifier 9, without interference by the TPM 2. In addition, assuming that the computation performed on the processor 6 of the host system 1 is based on computer code open for inspection, one can verify that the host system 1 does not cheat. This is in contrast to the TPM 2, whose internal working cannot easily be inspected.

In a first step 201, the host system 1 computes a basis Q for creating a subgroup with order Γ of a message space <S>, generated by a generator S, which is part of the public key $PK_I$ of the issuer 8. If the public key $PK_I$ is not already stored at the host system 1, it can be obtained, for example, over the data network 10 from the issuer 8. The basis $\zeta_I$ is used for generating a pseudonym $N_I$ for communication between the host system 1 and the TPM 2 on one side and the issuer 8 on the other side. The basis $\zeta_I$ is stored in the memory 5 of the host system 1 and may also be transmitted to the TPM 2 for storage in its memory 3.

In a step 202, the TPM 2 picks a random parameter $f_T$, which essentially forms the TPM's contribution to the secret part of the DAA key to be generated by the process. Thus, the chosen parameter $f_T$ is stored securely in the memory 3 of the TPM 2. Optionally, the TPM 2 can verify that the basis $\zeta_I$ is a valid generator of a proper subgroup of <S> to maintain the security provided by the original DAA protocol. This, however, is non-essential for maintaining anonymity.

The TPM 2 then computes a first contribution $N_{I,T}$ to the pseudonym $N_I$ based on an exponential function to the basis $\zeta_I$ with the exponent $f_T$ modulo, the order Γ of the subgroup defined by the basis $\zeta_I$. It also computes a first contribution $U_T$ to the message U using a basis R, which is also part of the public key $PK_I$ of the issuer 8, and $f_T$ as exponent modulo the order n of the group <S>, where n is a RSA modulus of the public key $PK_I$ of the issuer 8. The contributions $N_{I,T}$ and $U_T$ are provided to the processor 6 of the host system 1 using the interface 7.

In practice, the parameter $f_T$ is split into several parts, e.g., $f_{0T}$ and $f_{1T}$, for reasons of computational efficiency. However, in order to keep the description as simple as possible, it will be referred to as $f_T$ henceforth. The same is true for the basis R used for computing the message $U_T$. In addition, the message $U_T$ is based on a second secret parameter v chosen by the TPM 2, which is also used as an exponent to a further basis S in the computation of $U_T$. The mathematical equations defining the computations precisely are included in the section entitled "The modified direct anonymous attestation protocol" detailed below.

As should be obvious to a person skilled in the art of cryptography, any other one way function instead of a modular exponential function can be used in order to generate the pseudonym $N_{I,T}$ and the message $U_T$. The important feature of the function used here is to make it computationally infeasible to recover the secret parameter f used in the computation of $N_{I,T}$ and $U_T$. The same note applies, of course, to all other messages and message contributions computed based on exponential functions throughout this application.

In step 203, the host system 1 performs essentially the same procedure as the TPM does in step 202, i.e., it picks a random parameter $f_H$ of its own and computes contributions $N_{I,H}$ and $U_H$ in the same way as described above. In theory this step should be performed by the host system 1 before it has knowledge of the contributions $N_{I,T}$ and $U_T$ of the TPM 2, because, otherwise, the host system 1 can chose its parameter $f_H$ in such a way that the combined DAA key still contains secret information. However, as discussed above, the host system 1 can always disclose its identity by other means and thus step 203 can be performed before, after or in parallel with step 202, as long as the TPM does not know the results of step 203 before it has completed step 202.

In step 204, the host system 1 combines the contributions $N_{I,T}$ and $N_{I,H}$ by multiplication in order to form the final pseudonym $N_I$. The same is done with the contributions $U_T$ and $U_H$. By multiplying the results of two exponential functions to the same basis, the exponents, which are the secret parameters $f_T$ and $f_H$ in this case, are effectively added. In this way the host system 1 can compute a DAA key based in part on a secret parameter $f_T$, which it does not know and cannot easily recover due to the properties of the chosen function.

In practice, steps 203 and 204 can be combined, i.e., the host system 1 does not need to explicitly compute $N_{I,H}$ and $U_H$, but can just randomize the received contribution $N_{I,T}$ and $U_T$ of the TPM 2 in a single step, e.g., modify by multiplication with its own part.

Before the public part of the computed DAA key comprising the pseudonym $N_I$ and the message U is transmitted to the issuer 8 for certification, both the TPM 2 and the host system 1 need to be convinced that the generated key was computed correctly, e.g., that the contributions computed by the respective parties are still contained in the final key.

In a first proof, in step 205, the host system 1 verifies that the contribution $U_T$ of the TPM 2 to the message U is part of the group defined by the generator <S> included in the public key $PK_I$ of the issuer. This is done, because the TPM 2, could encode information into a message U by deliberately leaving the group <S> it is supposed to be part of.

Because in this proof the verifying host system 1 does not know the order of the group, i.e., the RSA modulus used for its generation, the TPM 2 has a chance of one in two of cheating, i.e., correctly responding to a challenge set by the host system 1 although it does not know the secret parameter $f_T$ used for the computation of $U_T$. However, by repeating the proof a number of times using different challenges, the chance of cheating can be minimized below a predefined threshold.

In addition, assuming that the host system 1 includes a TPM 2 from a series which is widely used by other hosts of the network 10, one can assume that at least one TPM 2 of this series would fail this proof and that this failure would be made public, i.e., by the host system 1 containing it or the issuer 8. Thus, in practice, it will usually suffice to perform the second proof only once.

In a second proof, in step 206, the host system 1 proves to the TPM 2 that it computed $N_I$ correctly, i.e., that $N_I$ is based on a product in which $N_{I,T}$ was used as a multiplier. More specifically the host has to prove knowledge of the secret parameter $f_H$ used as exponent for its contribution $N_{I,H}$. Proving the knowledge of a discrete logarithm can be achieved using standard cryptographic methods, e.g., based on a so-called zero-knowledge proof such as the one underlying the Schnorr's signature scheme.

Conceptually, the proofs described here are implemented as challenge-response mechanisms. After an initial proof commitment message of the prover to the verifier, a challenge defined by the verifier, i.e., the TPM 2 in case of the second proof, is transmitted to the prover. This challenge can be computed only if the prover, i.e., the host system 1, has knowledge of some secret, e.g., the secret parameter $f_H$. The returned response can then be verified as correct by the verifier without the possibility of discovering the secret.

The TPM 2 does not need to prove to the host system 1 that its contributions are still included in the final DAA key, as the host knows the computation it performs in step 204. Consequently the host system 1 also knows that the resulting pseudonym $N_I$ and message U are truly random as long as it is based on its own random parameter $f_H$.

In step 207, the TPM 2 checks whether the second proof was completed successfully. If this is the case, i.e., if the TPM 2 is convinced that its secret parameter $f_T$ was used to compute the pseudonym $N_I$, which is part of the DAA key, it authenticates the pseudonym $N_I$ in step 208 using its secret endorsement key EK stored in memory 3. The authenticated pseudonym $N_{I,auth}$ is than transmitted to the host system 1 again.

In step 209, the host system 1 checks whether the first proof was completed successfully, i.e., if the contribution $U_T$ of the TPM 2 lies in the group <S>. If this is the case, it will, upon receiving the authorized pseudonym $N_{I,auth}$, make the public part of the DAA key, i.e., the pseudonym $N_{I,auth}$ and the message U, available to an issuer 8 for certification in step 210.

It is important to note here that either party can block the successful completion of the key generation process during the proof verification process 207 and 209, respectively. This is because the host system 1 cannot generate a valid key without authentication using the endorsement key EK of the TPM 2, and the TPM 2 cannot transmit a key without the help of the host system 1 controlling all network communication. Thus, if either party mistrusts the other, it can always abort the key generation process as indicated in FIG. 2.

Figure 3:
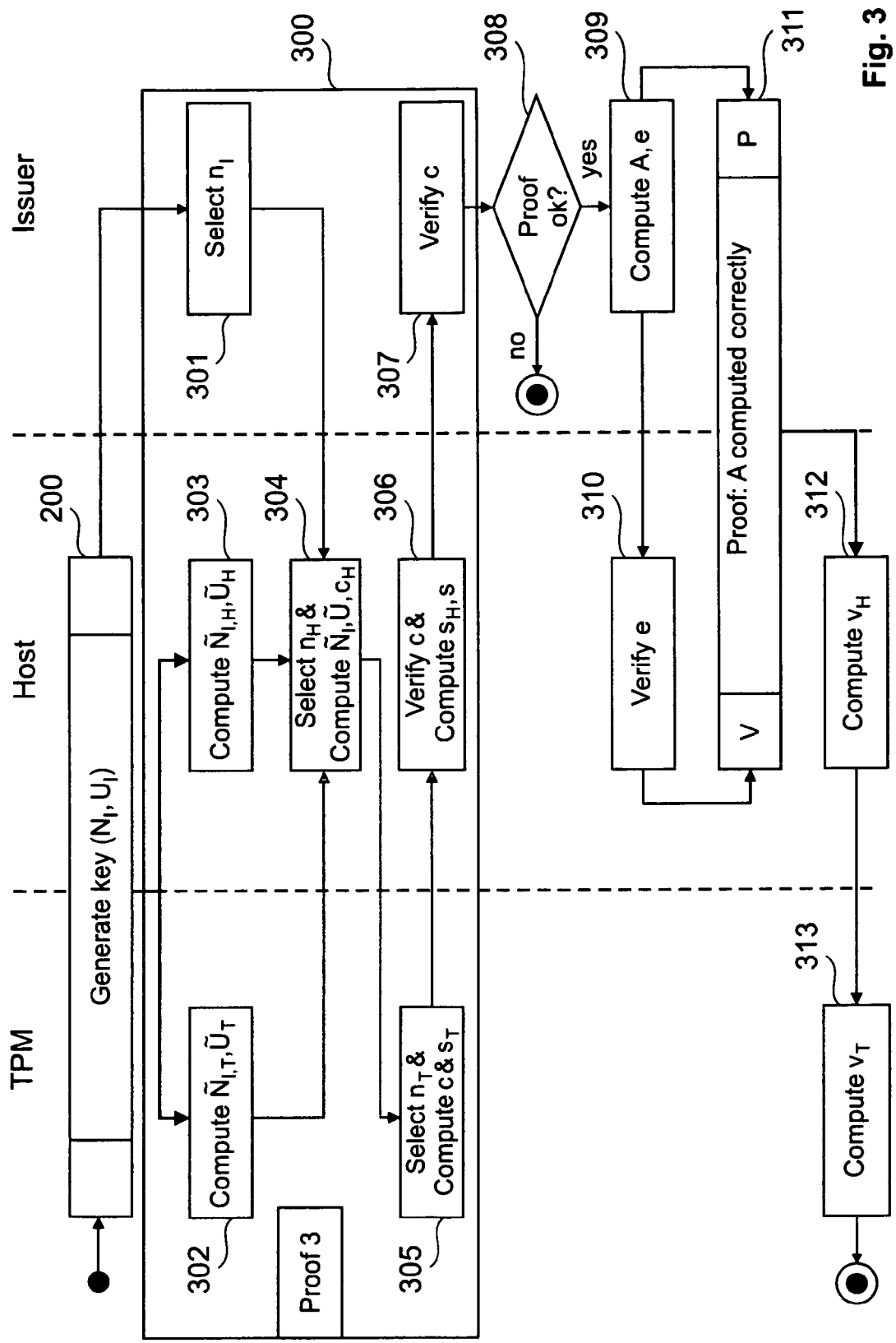
FIG. 3 provides a flowchart of a method for joining a generated key in accordance with an embodiment of the present invention.

FIG. 3 shows a flowchart of a further method, in which a DAA key, generated as described above, is certified by an issuer 8. From the issuer's perspective the join protocol remains unchanged. This is an advantageous feature of the presented embodiment of the invention, as it allows backward compatibility with the original DAA protocol.

However, due to the fact that neither the host system 1 nor the TPM 2 possesses complete knowledge of the secret parameter f used in the computation of the pseudonym $N_I$ and the message U, they must collaborate in order to successfully complete a challenge set by the issuer 8, before it will issue a certificate on the DAA key. Thus, only the steps performed by the host's side, typically a combination of software running on the processor 6 of the host system 1 and some functionality implemented in hardware in the TPM 2 are modified with respect to the original DAA protocol.

In order to prove knowledge of the secret key f, in step 300, the host system 1 and the TPM 2 perform another zero-knowledge proof to the issuer 8. This will prove to the issuer that the TPM 2 together with the host system 1 have knowledge of a discrete logarithm, i.e., the secret parameter f, which is the sum of $f_T$ and $f_H$ and which was used to compute the pseudonym $N_I$ and has also contributed to the generation of U.

For this third proof, the host system 1 transmits the public part of the DAA key, i.e., the pseudonym $N_I$ and the message U computed in step 200, to the issuer 8 as a proof commitment message. In a step 301, the issuer 8 picks a random parameter $n_I$ and transmit it back to the host system 1 as a challenge. The host system passes the parameter $n_I$ on to the TPM 2.

In practice, the issuer 8 checks whether the pseudonym $N_I$ was signed by a secret part of an endorsement key EK, to which the issuer 8 holds a public part. For this purpose, the issuer 8 has access to a database with the public parts of all endorsement keys EK of valid TPMs 2, for example.

If the issuer 8 accepts the pseudonym $N_I$ to originate from a valid TPM 2, it encrypts the parameter $n_I$ for security reasons using the public part of the endorsement key EK used to authenticate the received pseudonym $N_I$. Thus, only the TPM 2 with the secret part of that endorsement key EK can decrypt the parameter $n_I$.

The TPM 2 and the host system 1 have to collectively prove now that they know the secret parameters $f_T$ and $f_H$ used to generate the pseudonym $N_I$ and the message U. Although this proof follows a standard prove of knowledge of a discrete logarithm as described above, it needs to be modified as each party, the TPM 2 and the host system 1, has only partial knowledge of that logarithm.

In a step 302, the TPM 2 picks another random parameter $r_T$ as exponent and computes another contribution $\tilde{N}_{I,T}$ and $\tilde{U}_T$ using the same basis $\zeta_I$ and R respectively and mechanism as used during the key generation and described in step 202.

The host system 1 also picks another random parameter $r_H$ in step 303 and performs a similar operation, i.e., computes another contribution $\tilde{N}_{I,H}$ and $\tilde{U}_H$.

In a step 304, the host system 1 receives the contributions $\tilde{N}_{I,T}$ and $\tilde{U}_T$ from the TPM 2 and, just as in step 204 of the key generation process, multiplies them with its own contribution $\tilde{N}_{I,H}$ and $\tilde{U}_H$. Still in step 304, the host system 1 computes a challenge $c_H$ based on the random parameter $n_I$ of the issuer 8 and another random number $n_H$ picked by the host. This challenge $c_H$ is then transmitted to the TPM 2.

In step 305, the TPM 2 picks another random parameter $n_T$ and transforms the challenge $c_H$ received from the host into a challenge c by means of a hash function. It then computes a first contribution $s_T$ to a response to the issuer's 8 challenge using the random parameter $r_T$.

This contribution is then transferred back to the host system 1, which, using its own parameter $r_H$, computes a second contribution $s_H$ to the challenge in step 306. The host also verifies that the TPM has computed the challenge c correctly. The contributions $s_T$ and $s_H$ are then combined to a response s, here by adding, and transmitted to the issuer 8 for verification.

The issuer 8 then verifies the correctness of the response by means of a hash function in step 307. This in effect completes the proof of knowledge of the secret parameter f used for the key generation in step 200.

As in the key generation process, both the parameters $r_T$ and $r_H$ used as exponents and the contributions $s_T$ and $s_H$ are actually formed by several parts for ease of computation. This does not, however, make a fundamental difference to the method described here and will thus be omitted for reasons of clarity.

If, in a step 308, the issuer 8 is convinced, that the host system 1 and TPM 2 together possess knowledge on the parameters $f_H$ and $f_T$, in a step 309 the issuer 8 computes a valid certificate (A, e) based on its secret key $SK_I$ and the pseudonym U used during the key generation. If the issuer 8 cannot verify the proof in step 308, it will abort the join procedure and not issue a certificate.

In step 310, the host system 1 verifies a part of the certificate. After this, in step 311, the issuer 8 proves to the host system 1 that the signature (A, e) was computed correctly. While this proof is not important to maintain the security of the overall DAA scheme, it is important to ensure the anonymity of the host later in instances of the sign protocol.

Finally, in step 312, the host system 1 computes a first contribution $v_H$ to the certificate (A, e), while the TPM 2 computes a second contribution $v_T$ to the certificate (A, e). Both TPM 2 and host system 1 store their respective contributions for future use, e.g., for use in the signing protocol.

Figure 4:
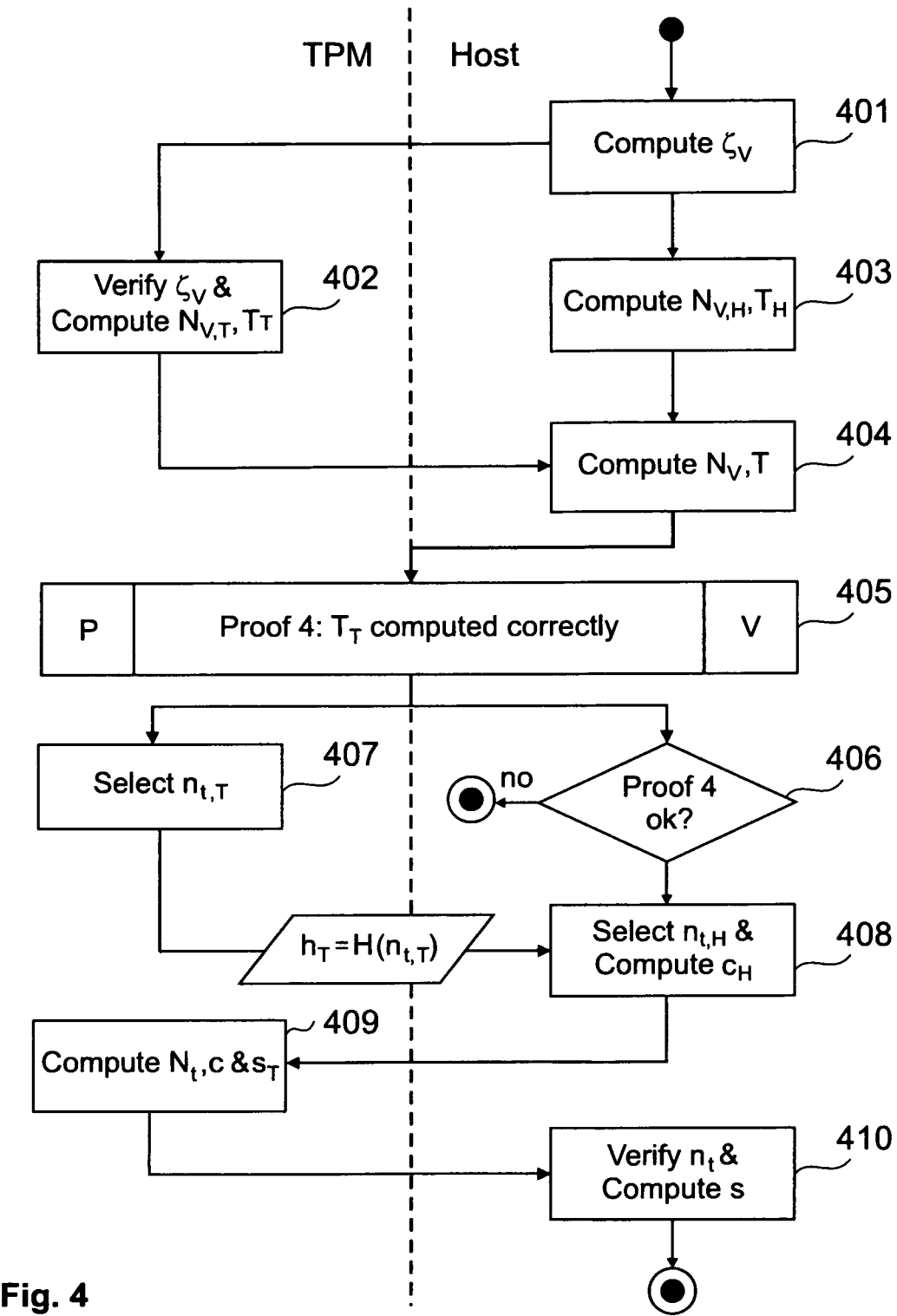
FIG. 4 provides a flowchart of a method for signing a message in accordance with an embodiment of the present invention.

FIG. 4 shows a flow chart of an embodiment of an inventive method for signing messages with a certified DAA key. Like the key generation 200, this is a process performed jointly by the host system 1 and the TPM 2. In FIG. 4 all operations performed by the TPM are shown on the left, while operations of the host are shown on the right. As before, the sequence of the operation can be modified.

The objective of the signing process is to compute a signature σ on a message m such that a verifier 9 can be convinced that the sender of the message has knowledge of a secret key and a certificate on it, which were used to generate the signature on the message m. In this way, the verifier 9 can be certain that the message m is authentic and originates from a host platform 1 with a TPM 2, which was certified by an issuer 8.

Conceptually this is equivalent to another proof of knowledge, in which the host system 1 with the TPM 2 prove to the verifier 9 that they possess knowledge of the secret parameter f and the certificate (A, e) on it. To prove this, the TPM 2 and the host system 1 first compute a proof commitment message $T_V$ and a pseudonym $N_V$. Then, upon receiving or computing a suitable challenge c, they compute a response message s, which proves with respect to the challenge c that they know the secret parameter f and the certificate (A, e) on it.

Like in the key generation, the host system 1 needs to be sure that the TPM 2 cannot encode any hidden information into the messages $T_V$ or s or the pseudonym $N_V$. This can be achieved by randomizing contributions of the TPM 2 to the proof.

In a first step 401, the host system 1 computes a basis $\zeta_V$ for creating a subgroup with order ρ. Depending on a request of the verifier 9, the basis $\zeta_V$ can be generated by the host system 1 alone or be based upon a base name bsn provided by the verifier 9. The latter case is particularly useful, if, instead of remaining completely anonymous, the host system 1 wants to use a pseudonym $N_V$, which is specific to the particular verifier 9. This can be used, for example, to maintain a connection state between individual message exchanged between the host system 1 and that verifier 9 in a common session, i.e., to maintain a session state.

The basis $\zeta_V$ is then made available to the TPM 2 over the interface 7. Optionally the TPM 2 can verify if the basis $\zeta_V$ was computed correctly, e.g., by verifying that it indeed generates a subgroup of order ρ.

In a step 402, the TPM 2 picks a random parameter $r_H$, which is used to hide the certificate (A, e) in a first contribution $T_T$ to a first message T by computing an exponential function with the base A and the exponent r.

In practice, the certificate (A, e) comprises multiple parts that are encoded using multiple messages $T_1$ and $T_2$. Thus, the TPM 2 chooses several random parameters and computes several contributions $T_{1T}$, $T_{2T}$ and so on. In addition, other exponential functions based on the public key $PK_I$ of the issuer are computed using a further random parameter w.

However, in order to keep the description simple, only the proof of knowledge of a single part of the certificate will be described here.

In addition, the TPM 2 computes a first contribution $N_{V,T}$ to a pseudonym $N_V$ for communication with the verifier 9. This is done in the same way as in step 202 of the key generation process, but using $\zeta_V$ as a basis. The contributions $N_{V,T}$ and $T_T$ are provided to the processor 6 of the host system 1.

In step 404 the host system 1 randomizes the first contribution $N_{V,T}$ of the TPM 2 by multiplying it with its own contribution $N_{V,H}$ based on the second secret parameter $f_H$ and computed in step 403. In addition, the host system 1 also randomizes the message T by computing a second contribution $T_H$ to this message based on further secret parameters $r_H$ and multiplying it with the TPM's contribution $T_T$.

In step 405, the TPM 2 proves to the host, that its contribution $T_T$ lies in a subgroup generated by S, the group generator of the message space <S>. This fourth proof is similar to the one of step 206 described for the key generation process and thus will not be described here. It makes sure that the TPM cannot hide any information in the message T and concludes the computation of the first part of the signature σ, i.e., the proof commitment message T.

In step 406, the host system 1, checks whether the proof of step 405 was completed successfully. If this is the case, the host system 1, together with the TPM 2, computes a challenge c, to which the TPM 2 has to respond using its knowledge of the secret parameter $r_T$. This forms the second part s of the signature σ.

In theory, the challenge c is computed by the verifier 9. However, in order to make the signing protocol more efficient, the challenge c, can be based on a hash function on a random parameter $n_t$ combined with the message T and the pseudonym $N_V$, is pre-computed by the TPM 2. In order to allow the verifier 9 to analyze whether the challenge c was computed correctly, the challenge c together with the random parameter $n_t$ is included in the final signature σ, as will be described below.

Again it is crucial that both the TPM 2 and the host system 1 contribute to the random parameter $n_t$ to ensure the security and anonymity of the scheme. According to the DAA protocol, the TPM 2 has to contribute to this parameter $n_t$ in order to prevent replay attacks. At the same time the host system 1 needs to add a contribution to make sure that the parameter $n_t$ is truly random even if the TPM 2 is corrupted.

To prevent either party from cheating in this process, the TPM 2 picks its contribution $n_{t,T}$ first in step 407 and transmits a hash value $h_T$ of it to the host system 1. In a further step 408, the host system 1 then picks its own contribution $n_{t,H}$, still not knowing the TPM's 2 contribution $n_{t,T}$ and sends it to the TPM 2. The TPM 2 then combines both contribution to the final parameter $n_t$ in step 409 and returns it to the host system 1. In a step 410, the host system 1 can then verify that both contributions are indeed contained in it, using the hash value $h_t$ and its knowledge of its own contribution $n_{t,H}$.

During this process, in step 409, the TPM 2 also transforms an initial challenge $c_H$ computed by the host in step 408 using the random parameter $n_t$ into the final challenge c. Still as a part of step 409, the TPM then responds to the challenge c by computing a first contribution to a response $s_T$ based on the knowledge of the secret parameters $r_T$ and $f_T$ and returns it to the host system 1.

In step 410, the host system 1 also transforms the response $s_T$ to a response s using its knowledge of the secret parameters $r_H$ and $f_H$. At this step the host system 1 can verify that all parts computed by the TPM 2 were computed correctly, particularly, that they still contain the contributions provided by the host itself.

The response s, in combination with the challenge c, the random parameter $n_t$, the basis $\zeta_V$, the pseudonym $N_V$, and the message T make up the signature σ, which is made available to a verifier at the end of step 410.

The final procedure that is part of the DAA protocol is the verification of a signature σ through the verifier 9. As this procedure is performed by the verifier alone, it does not need to be changed in accordance with the presented embodiment of the invention and is only described very briefly for reasons of completeness here.

Essentially the verifier 9 verifies, whether the challenge c was computed correctly, e.g., is based on the message m to be signed, the random parameter $n_t$, the public key of the verifier, the pseudonym $N_V$ and the message T. If the basis $\zeta_V$ was derived from a base name bsn, the verifier might check additionally, if the basis $\zeta_V$ was formed correctly.

If the verifier 9 has access to a black list 11 containing secret parameters f extracted from rogue TPMs 2, it can compute pseudonyms $N_{rogue}$ based on the basis $\zeta_V$ and the secret parameters f from the list and compare them with the pseudonym $N_V$ received as part of the signature σ. Consequently, signatures originating from rogue TPMs 2 can be detected and rejected as invalid authentication.

If all checks are verified successfully by the verifier 9, i.e., if the signature σ contains a valid proof of knowledge of a certified key, the verifier can trust the message m to be authentic and to originate from a trusted host platform 1. Thus, it might decide to grant access to resources sought or other requests encoded in the message m to the host system 1.

According to the DAA protocol, the message m actually contains another asymmetric key, called the attestation identity key (AIK), which is used for secure and anonymous communication between the host system 1 and the verifier 9. Consequently, by performing the methods described above, a host can generate and authenticate a separate attestation identity key for use with each verifier 9, without allowing the verifiers 9 or the issuer 8 to link these keys together, i.e., to uncover that they originate from the same host platform 1. However, from a practical point of view the content of the message m is irrelevant for its signing by the host system 1 and the TPM 2 and its verification by the verifier 9.

The Modified Direct Anonymous Attestation Protocol

Although the following steps are enumerated for ease of reference, this does not necessarily imply a strict order, in which they are performed. Since the underlying method is performed in a distributed manner, i.e., is partly executed by the TPM 2, the host computer 1, the issuer 8 and the verifier 9, steps can be performed in parallel as long as all prerequisites have been computed already.

The following equations define the length in bits of parameters chosen during the subsequently described protocols.

$$\ell_e > \ell_f + 2\ell_+ \ell_H + 4 \quad (1)$$

$$\ell_{e'} > \ell_e + \ell_+ \ell_H + 2 \quad (2)$$

$$\ell_v > \ell_n + \ell_f + 2\ell_+ \ell_H + \ell_r + 3 \quad (3)$$

$$\ell_\rho = 2\ell_f \quad (4)$$

Compared with the original DAA protocol, the bit lengths of the parameters e and v have been increased in order not to allow the TPM and the host each to contribute to the secrets originally chosen solely by the TPM.

Key Generation

During the join protocol, a key is generated by a host in collaboration with a built-in TPM. Knowledge of the secret parameters $f_0$ and $f_1$, forming the private part of the key, is then proved to an issuer, who, in response, will issue a certificate on that key.

In order to ensure anonymity, even in case of a rogue TPM, the original protocol is modified in such a way that it ensures that a message U computed during the key generation lies in the right group and that the secret parameters $f_0$ and $f_1$ are not known to any single party, if at least either the host or the TPM are honest.

1. At first, the host computes a basis $\zeta_I$ for the generation of a pseudonym $N_I$ with an issuer with base name $bsn_I$, where Γ is the order of the group used for key generation, ρ is the order of a sub group of that group, H is a hash function and || denotes the concatenation of bit strings.

The host computes $$\zeta_I := (H_\rho(1\|bsn_I))^{(\Gamma-1)/\rho} \mod \Gamma$$

and sends $\zeta_I$ to the TPM.

2. The TPM then verifies that the $\zeta_I$ generated by the host is a valid basis for creating a sub group of S, i.e., the message space:

The TPM checks whether $\zeta_I^\rho \equiv 1 \pmod{\Gamma}$.

3. The TPM then generates a random number DAA-seed, used as a seed for generating the secret parameters $f^{(t)}$ the TPM and sets $$i := \left\lfloor \frac{\ell_\rho + \ell}{\ell_H} \right\rfloor,$$

which is 1 for the values chosen in equations 1 to 4.

The TPM then computes, based on the public key $PK_I$ of the issuer:

$$f^{(t)} := H_{hk}(H_{hk}(PK_I\|DAA\text{-seed}\|cnt\|0)\| \ldots \|H_{hk}(H_{hk}(PK_I\|DAA\text{-seed}\|cnt\|i))(\mod \rho), \quad (5)$$

$$f_0^{(t)} := LSB_{l_f}(f^{(t)}), f_1^{(t)} := CAR_{l_f}(f^{(t)}), \quad (6)$$

$$v_1^{(t)} \in_R \{0,1\}^{l_s}, v_2^{(t)} \in_R [0, n^r], \quad (7)$$

$$U^{(t)} := R_0^{f_0^{(t)}} R_1^{f_1^{(t)}} S^{v_1^{(t)}} S'^{v_2^{(t)}} \mod n N_I^{(t)} := \zeta_I^{f^{(t)}} \mod \Gamma \quad (8)$$

Then, $U^{(t)}$ and $N_I^{(t)}$ are sent to the host, which in turn generates its own secret parameters $f^{(h)}$ based on another random hash seed.

4. The host computes and chooses:

$$f^{(h)} := H_{hk}(H_{hk}(\text{host-seed}\|N_I^{(t)}\|0)\| \ldots \|H_{hk}(H_{hk}(\text{host-seed}\|N_I^{(t)}\|i))(\mod \rho) \quad (9)$$

$$f_0^{(h)} := LSB_{l_f}(f^{(h)}), f_1^{(h)} := CAR_{l_f}(f^{(h)}) \quad (10)$$

$$\overline{v}^{(h)} \in_R \{0,1\}^{l_n+l_s}(11) \quad (11)$$

$$U := U^{(t)} R_0^{f_0^{(h)}} R_1^{f_1^{(h)}} S^{\overline{v}^{(h)}} \mod n N_I := N_I^{(t)} \zeta_I^{f^{(h)}} \mod \Gamma \quad (12)$$

and sends $N_I$ to the TPM.

5. The host sends the pseudonym $N_I$ to the TPM for verification and takes the role of a prover in the following proof with the TPM as a verifier:

$$PK\{(\alpha): N_I/N_I^{(t)} = \zeta_I^\alpha \pmod{\Gamma}\}$$

This is proved using a protocol similar to the one underlying the Schnorr signature scheme, in which one party, here the host, proves knowledge of a discrete logarithm to a second party, here the TPM.

6. If the TPM accepts the proof, it then authenticates $N_I$ to the issuer by signing it with its endorsement key EK.

7. The TPM proves to the host the following statement:

$$PK\{(\gamma,\delta,\epsilon,\xi): U^{(t)} = R_0^\gamma R_1^\delta S^\epsilon S'^\xi\} \tag{13}$$

For mathematical reasons, the TPM has a chance of one in two of cheating in this proof, i.e., of making the host believe, that the message part $U^{(t)}$ was computed correctly from $R_0$, $R_1$, S and S' although they were not. However, this possibility of cheating can be minimize either by repeating such a challenge several times or by having several TPMs execute it. In practice, as a manufacturer will distribute many identical TPMs, the chance of none of them ever getting caught cheating is in fact negligible.

This proof shows that $U^{(t)}$ lies in the subgroup generated by S. The above proof is almost identical to the proof the host and the TPM compute together in the steps below. In fact, the host could use the interface to the TPM for executing the steps below to execute the proof above. That is, it is not necessary to implement a new command for this into the TPM.

After both the TPM and the host are convinced that the pseudonym $N_I$ and the message U were computed correctly, the host transmits them to the issuer for obtaining a certificate on the secret key based on the secret parameters $f_0$ and $f_1$.

8. In order to do so, the TPM and the host prove to the issuer knowledge of $f_0$, $f_1$ and v' such that $U = R_0^{f_0} R_1^{f_1} S^{v'}$ and $N_I = \zeta_I^{f_0 + 2^{l_f} f_1}$ as follows:

(a) TPM chooses and computes $$r_{f_0}^{(t)}, r_{f_1}^{(t)} \epsilon_R \{0,1\}^{l_f + l_s + l_H}, \tag{14}$$

$$r_{v'_1}^{(t)} \epsilon_R \{0,1\}^{l_s}, r_{v'_2}^{(t)} \epsilon_R \{0,1\}^{l_n + l_s + l_H - l_s} \tag{15}$$

$$\tilde{U}^{(t)} := R_0^{r_{f_0}^{(t)}} R_1^{r_{f_1}^{(t)}} S^{r_{v'_1}^{(t)}} S'^{r_{v'_2}^{(t)}} \bmod n \tilde{N}_I^{(t)} := \zeta_I^{r_{f_0}^{(t)} + r_{f_1}^{(t)} 2^{l_f}} \bmod \Gamma \tag{16}$$

and sends $\tilde{U}^{(t)}$ and $\tilde{N}_I^{(t)}$ to the host.

(b) The host chooses and computes $$r_{f_0}^{(h)}, r_{f_1}^{(h)} \epsilon_R \{0,1\}^{l_f + 2l_s + l_H}, r_{v'}^{(h)} \epsilon_R \{0,1\}^{l_n + 2l_s + l_H} \tag{17}$$

$$\tilde{N}_I := \tilde{N}_I^{(t)} \zeta_I^{r_{f_0}^{(h)} + r_{f_1}^{(h)} 2^{l_f}} \bmod \Gamma \tilde{U} := \tilde{U}^{(t)} R_0^{r_{f_0}^{(h)}} R_1^{r_{f_1}^{(h)}} S^{r_{v'}^{(h)}} \bmod n. \tag{18}$$

(c) Issuer chooses a random string $n_i \in \{0,1\}^{l_H}$ and sends $n_i$ to the TPM.

(d) The TPM chooses a random $n_t \in \{0,1\}^l$ and computes $$c := H_{hk}(c_h \| n_i \| n_t) \in [0, 2^{l_H} - 1].$$

(e) The TPM computes $$s_{f_0}^{(t)} := r_{f_0}^{(t)} + c f_0^{(t)}, s_{f_1}^{(t)} := r_{f_1}^{(t)} + c f_1^{(t)}, \tag{19}$$

$$s_{v'_1}^{(t)} := LSB_{l_s}(r_{v'_1}^{(t)} + c v_1^{(t)}) \overline{s} := CAR_{l_s}(r_{v'_1}^{(t)} + c v_1^{(t)}) \tag{20}$$

$$s_{v'_2}^{(t)} := (r_{v'_2}^{(t)} + c v_2^{(t)} + \overline{s}) \tag{21}$$

(f) TPM sends $(c, n_t, s_{f_0}^{(t)}, s_{f_1}^{(t)}, s_{v'_1}^{(t)}, s_{v'_2}^{(t)})$, to the host, but keeps $s'_{v'_1}$ secret.

(g) The host computes $$s_{f_0} := r_{f_0}^{(h)} + c f_0^{(h)} + s_{f_0}^{(t)}, s_{f_1} := r_{f_1}^{(h)} + c f_1^{(h)} + s_{f_1}^{(t)}, \tag{22}$$

$$s_{v'} := s_{v'_1}^{(t)} + 2^{l_s} s_{v'_2}^{(t)} s_{v'} := r_{v'}^{(h)} + c \overline{v}^{(h)} + s_{v'}^{(t)}, \tag{23}$$

and checks $$s_{f_0}^{(t)}, s_{f_1}^{(t)} \stackrel{?}{\in} \{0,1\}^{l_f + l_s + l_H + 1} S_{v'}^{(t)} \stackrel{?}{\in} \{0,1\}^{l_n + l_s + l_H + 1}, \tag{24}$$

$$\tilde{U} \stackrel{?}{\equiv} U^{-c} R_0^{s_{f_0}} R_1^{s_{f_1}} S^{s_1} \bmod n \tilde{N}_I \stackrel{?}{\equiv} N_I^{-c} \zeta_I^{s_{f_0} + 2^{l_f} s_{f_1}} \bmod \Gamma \tag{25}$$

$$c \stackrel{?}{\equiv} H_{hk}(c_h \| n_i \| n_t) \tag{26}$$

and sends $(c, n_t, s_{f_0}, s_{f_1}, s_{v'})$ to the issuer.

(h) The issuer verifies the proof as follows $$\hat{U} := U^{-c} R_0^{s_{f_0}} R_1^{s_{f_1}} S^{s_v} \bmod n \text{ and } \hat{N}_I := N_I^{-c} \zeta_I^{s_{f_0} + 2^{l_f} s_{f_1}} \bmod \Gamma \tag{27}$$

and checks $$c \stackrel{?}{\equiv} H_{hk}\left(H_{hk}(n \| R_0 \| R_1 \| S \| U \| N_I \| \hat{U} \| \hat{N}_I) \| n_i \| n_t\right) \in [0, 2^{l_H} - 1] \tag{28}$$

$$s_{f_0}, s_{f_1} \stackrel{?}{\in} \{0,1\}^{l_f + 2l_s + l_H + 1} \tag{29}$$

$$s_{v'} \stackrel{?}{\in} \{0,1\}^{l_n + 2l_s + l_H + 1}. \tag{30}$$

9. The issuer chooses $\hat{v} \epsilon_R \{0,1\}^{l_v - 1}$ and a prime $e \epsilon_R [2^{l_e - 1}, 2^{l_e - 1} + 2^{l_e - 1}]$ computes $$v'' := \hat{v} + 2^{l_v - 1}$$

$$A := \left(\frac{Z}{US''}\right)^{1/e} \bmod n,$$

and sends (A, e, $v^H$) to the host.

10. The host verifies whether e is a prime and lies in $[2^{l_e - 1}, 2^{l_e - 1} + 2^{l_e - 1}]$.

11. The host chooses a random integer $n_h \in \{0,1\}^l$ and sends $n_h$ to the issuer.

12. The issuer randomly chooses $r_e \epsilon_R [0, p'q']$ and computes $$\tilde{A} := \left(\frac{Z}{US''}\right)^{r_e} \bmod n \tag{31}$$

$$c' := H_{hk}(n \| Z \| S \| U \| v'' \| A \| \tilde{A} \| n_h) \in [0, 2^{l_H} - 1] \tag{32}$$

$$s_e := r_e - c'/e \bmod p'q' \tag{33}$$

and sends c' and $s_e$ to the host.

13. The host computes $$\hat{A} := A^{c'} \left(\frac{Z}{US'}\right)^{s_e}$$

mod n and checks whether $$c' \stackrel{?}{\equiv} H_{hk}(n \| Z \| S \| U \| v'' \| A \| \hat{A} \| n_h).$$

14. The host computes $v^{(h)} := v^1 + \overline{v}^{(h)}$ and stores $(f_0^{(h)}, f_1^{(h)}, v^{(h)})$.

15. The TPM stores $(f_0^{(t)}, f_1^{(t)}, v_1^{(t)}, v_2^{(t)})$.

Together, the parameters stored in the TPM on the one hand and the host on the other hand, form a secret key and a certificate from the issuer on that key. However, neither host nor TPM, have complete knowledge of all parameters and thus can not use the key or certificate on their own. Thus, they need to collaborate in order to use this key for communication with a verifier.

Signing of a Message m for a Verifier V Using an DAA Certificate

The objective of the modified version of the DAA signing algorithm is to ensure that all the values in the signatures are random. While many values appearing in the signature are already controlled or at least contributed by the host, in particular those where the host and the TPM share the secrets that are used to compute them, there is a number that are not, i.e., that are computed only by the TPM. For those the protocol is modified such that they are computed together by the host and the TPM.

In addition the TPM needs to explicitly prove that the value $\tilde{T}_{1t}$ is computed correctly by the TPM, i.e., that it lies in the subgroup generated by S.

The signing algorithm comprises the following steps:

1. Computation of a basis $\zeta$ (a) Depending whether the verifier specifies a particular base name bsn or not, the host computes $\zeta$ as follows $\zeta \in_R \langle \gamma \rangle$ or $\zeta := (H_\rho(1\|bsn))^{(\Gamma-1)/\rho} \mod \Gamma$, where $H_\rho(\ )$ is a collision resistant hash function $H_\Gamma$: $\{0,1\}^* \to \{0,1\}^{l_\Gamma+l}$, and sends $\zeta$ to the TPM.

(b) The TPM checks whether $\zeta^\rho \equiv 1 (\mod \Gamma)$, i.e., whether it is a correct basis for the message space.

2. Computation of a host contribution to a pseudonym $N_V$ for communication with a verifier and a host contribution to proof commitment messages $T_1$ and $T_2$ (a) The host picks random integers $w, r \in [1, \lfloor n/4 \rfloor]$ and computes $T_1 := Ah^w \mod n$ and $T_2 := g^w h^e (g')^r \mod n$.

(b) The TPM computes $N_V^{(t)} := \zeta^{f_0^{(t)} + f_1^{(t)} 2^{lf}} \mod \Gamma$ and sends $N_V^{(t)}$ to the host.

(c) The host computes $N_V := N_V^{(t)} \zeta^{f_0^{(h)} + f_1^{(h)} 2^{lf}} \mod \Gamma$.

3. Computation of a TPM contribution to a pseudonym $N_V$ for communication with the verifier and a TPM contribution to the proof commitment messages $T_1$ and $T_2$ (a) The TPM picks random integers $r_{v_1} \in_R \{0,1\}^{l_s}, r_{v_2} \in_R \{0,1\}^{l_v+l+l_H-l_s}, r_{f_0}, r_{f_1} \in_R \{0,1\}^{l_f+l_H}$, and computes $\tilde{T}_{1t} := R_0^{r_{f_0}} R_1^{r_{f_1}} S^{r_{v_1}} S^{r_{v_2}} \mod n \tilde{r}_f := r_{f_0} r_{f_1} 2^{lf} \mod \rho \tilde{N}_t := \zeta^{\tilde{r}_f} \mod \Gamma$.

The TPM sends $\tilde{T}_{1t}$ and $\tilde{N}_t$ to the host.

(b) The TPM proves to the host the following statement, e.g., using binary challenges, and repeating it small number of times:

$PK\{(\alpha,\beta,\gamma,\delta): \tilde{T}_{1t} := R_0^\alpha R_1^\beta S^\gamma S^\delta (\mod n)\}$ This proof shows that $\tilde{T}_{1t}$ lies in the subgroup generated by S. It will be sufficient to run this proof a small number of times, e.g., once, as there will be many identical TPM. Moreover, one could test TPMs to run this protocol correctly. Similarly as was the case in the join protocol, it is noted that instead of the above proof is almost identical to the proof the host and the TPM compute together in the steps below. In fact, the host could use the interface to the TPM for executing the steps below to execute the proof above. That is, it is not necessary to implement a new command for this into the TPM. However, if this is done, one would need to insure that the message m is the same in all these calls.

(c) The host pick random integers $r_{h_2} \in_R \{0,1\}^{l_v+2l_s+l_H-l_s}, r_{h_0}, r_{h_1} \in_R \{0,1\}^{l_f+2l_s+l_H}$, $r_e \in_R \{0,1\}^{l_e+l+l_H}, r_{ee} \in_R \{0,1\}^{2l_e+l+l_H+1}$, $r_w, r_r \in_R \{0,1\}^{l_n+l+l_H} r_{ew}, r_{er} \in_R \{0,1\}^{l_e+l_n+l+l_H+1}$ and computes $\tilde{T}_1 := \tilde{T}_{1t} R_0^{r_{h_0}} R_1^{r_{h_1}} S^{r_{h_2}} T_1^{r_e} h^{-r_{ew}} \mod n, \tilde{T}_2 := g^{r_w} h^{r_e} g^{r_r} \mod n,$ (34)

$\tilde{T}'_2 := T_2^{-r_e} g^{r_{ew}} h^{r_{ee}} g^{r_{er}} \mod n, \tilde{N}_V := \tilde{N}_t \zeta^{r_0+2^{lf} r_{h_1}} \mod \Gamma.$ (35)

4. Computing of a challenge (a) The TPM chooses a random $n_t^{(t)} \in \{0,1\}^l$, computes $h_t := H_{hk}(n_t^{(h)})$ and sends $h_t$ to the host.

(b) The host chooses a random $n_t^{(t)} \in \{0,1\}^l$ and sends it to the TPM.

(c) Host computes $c_h := H_{hk}((hk\|n\|g\|g'\|h\|R_0\|R_1\|S\|Z\|\gamma\|\Gamma)\|\zeta\|(T_1\|T_2)\|N_V\| (\tilde{T}_1\|\tilde{T}_2\|\tilde{T}'_2)\|\tilde{N}_V)) \in [0, 2^{l_H}-1]$.

and sends $c_h$ and $n_i$ to the TPM (d) The TPM computes $n_t := n_t^{(t)} + n_t^{(h)} \mod 2^l$ and $c := H_{hk}(c_h \| n_i \| n_v \| b \| m) \in [0, 2^{l_H}-1]$.

and sends $c, n_t$ to the host.

(e) The host verifies that $h_t := H_{hk}(n_t - n_t^{(h)} \mod 2^l)$.

5. Computation of a response message to the challenge (a) The TPM computes (over the integers)

$\bar{s}_{v_1} := LSB_{l_s}(r_{v_1} + cv_1) \bar{s}'_{v_1} := CAR_{l_s}(r_{v_1} + cv_1)$
$\bar{s}_{v_2} := (r_{v_2} + cv_2 + s'_{v_1})$ $\bar{s}_{f_0} := r_{f_0} + cf_0 \bar{s}_{f_1} := r_{f_1} + cf_1$ and sends $(s_{v_1}, s_{v_2}, s'_{f_0}, s'_{f_1})$ these values to the host. (Note that $s'_{v_1}$ must not be sent to the host)

(b) The host computes (over the integers)

$s_e := r_e + c(e - 2^{l_e}) s_{ee} := r_{ee} + cee$ $s_w := r_w + cw s_{ew} := r_{ew} + cwe$ $s_r := r_r + cr c_{er} := r_{er} + cer$ $\bar{s}_v := \bar{s}_{v_1} + 2^{l_s} \bar{s}_{v_2} s_v := r_{h_2} + cv^{(h)} + \bar{s}_v$ $s_{f_0} := r_{h_0} + cf_0^{(h)} + \bar{s}_{f_0} s_{f_1} := r_{h_1} + cf_1^{(h)} + \bar{s}_{f_1}$ and verifies $\tilde{T}_1 \stackrel{?}{\equiv} Z^{-c} T_1^{s_e + c 2^{l_e}} R_0^{s_{f_0}} R_1^{s_{f_1}} S^{s_v} h^{-s_{cw}} (\mod n),$ (36)

$\tilde{N}_V \stackrel{?}{\equiv} N_V^{-c} \zeta^{s_{f_0} + s_{f_1} 2^{lf}} \mod \Gamma,$ (37)

$c \stackrel{?}{\equiv} H_{hk}(c_h \| n_i \| n_v \| b \| m)$ (38)

$N_V, \zeta \stackrel{?}{\in} \langle \gamma \rangle$ (39)

$\bar{s}_{f_0}, \bar{s}_{f_1} \stackrel{?}{\in} \{0, 1\}^{\ell_f + \ell_+ + \ell_H + 1}$ (40)

$\bar{s}_v \stackrel{?}{\in} \{0, 1\}^{\ell_v + \ell_+ + \ell_H + 1}$ (41)

and outputs the signature $\sigma := (\zeta, (T_1, T_2), N_V, c, n_t, (s_v, s_{f_0}, s_{f_1}, s_e, s_{ee}, s_w, s_{ew}, s_r, s_{er})).$ (42)

Verifying a Signature σ of a Message m

The verifier then verifies the correctness of the signature as it was done in the original DAA protocol. Consequently, no changes are necessary on the verifier or the software running at the verifier's side. The following description is included for completeness, in order to show how the DAA protocol is completed successfully.

The verification of a signature $$\sigma=(\zeta,(T_1,T_2),N_V,c,n_t,(s_v,s_{f_0},s_{f_1},s_e,s_{ee},s_w,s_{ew},s_r,s_{er})) \qquad (43)$$

on a message m with respect to the public key
(hk, n, g, g', h, $R_0$, $R_2$, S, Z, γ, Γ, ρ)
comprises the following steps:

1. Compute $$\hat{T}_1 := Z^{-c} T_1^{s_e + c 2^{l_e}} R_0^{s_{f_0}} R_1^{s_h} S^{s_v} h^{-s_{ew}} \bmod n, \qquad (44)$$

$$\hat{T}_2 := T_2^{-c} g^{s_w} h^{s_e + c 2^{l_e}} g^{l_2_r} \bmod n, \qquad (45)$$

$$\hat{T}'_2 := T_2^{-(s_e + c 2^{l_e})} g^{s_{ew}} h^{s_{ee}} g^{s_{er}} \bmod n, \text{ and} \qquad (46)$$

$$\hat{N}_V := N_V^{-c} \zeta^{s_{f_0} + s_{f_1} 2^{l_f}} \bmod \Gamma. \qquad (47)$$

2. Verify that $$c \stackrel{?}{=} H_{ik}\big(H_{ik}\big((hk\|n\|g\|g'\|h\|R_0\|R_1\|S\|Z\|\gamma\|\Gamma\|\rho)\| \qquad (48)$$
$$\zeta\|(T_1\|T_2)\|N_V\|(\hat{T}_1\|\hat{T}_2\|\hat{T}'_2)\|\hat{N}_V\big)\|n_t\|n_v\|b\|m\big)$$

$$N_V, \zeta \stackrel{?}{\in} \langle\gamma\rangle \qquad (49)$$

$$s_{f_0}, s_{f_1} \stackrel{?}{\in} \{0,1\}^{l_f + 2l_+ + l_H + 1} \qquad (50)$$

$$s_e \stackrel{?}{\in} \{0,1\}^{l_f + l_+ + l_H + 1} \qquad (51)$$

3. If ζ was not chosen at random but derived from a verifier base name bsn, then check whether $$\zeta \stackrel{?}{=} (H_\rho\|(bsn))^{(\Gamma-1)/\rho} (\bmod \Gamma).$$

4. For all ($f_0$, $f_1$) on the revocation list check whether $$N_V \stackrel{?}{\neq} (\zeta^{f_0 + f_1 2^{l_f}}) (\bmod \Gamma).$$

It should be noted here that the revocation list, i.e., a black list comprising the secret parameters $f_0$ and $f_1$ of all TPMs which have previously identified as rogue TPMs, is expected to be short. Consequently, step 4 is computationally feasible.

The invention claimed is:

1. A cryptographic method for allowing trusted communications at a computing device comprising a host computer system having at least one processing device and an associated trusted platform module (TPM) integrated into the host computer system comprising the steps of:
  computing a first contribution to a message by the TPM, the first contribution being based on a first secret parameter stored in the TPM;
  computing a second contribution to the message by the host system, the second contribution being based on a second secret parameter stored in the host system outside the TPM;
  combining the first and second contributions to the message at one of the host and the TPM; and
  conducting a first proof to determine whether the contribution of one of the host and the TPM was computed correctly.

2. The cryptographic method according to claim 1, wherein the step of conducting the first proof comprises:
  providing a public key of an issuer to the host and the TPM; and
  proving either that the first contribution or the second contribution to the message lies in a subgroup defined by at least a part of the public key of the issuer.

3. The cryptographic method according to claim 1, wherein the host system combines the first and the second contributions to the message and the TPM conducts the first proof, proving to the host system that the contribution of the TPM was computed correctly, and wherein the method further comprises:
  computing a pseudonym for communication with an issuer based on the first secret parameter and the second secret parameter;
  conducting a second proof, proving to the TPM that the pseudonym was computed correctly;
  authenticating the pseudonym by the TPM using a secret endorsement key stored in the TPM, if the TPM accepts the second proof; and
  making available the authenticated pseudonym and the combined message through the host, if the host accepts the first proof.

4. The cryptographic method according to claim 3, wherein the step of computing the pseudonym comprises:
  providing a public key of an issuer to the host and the TPM;
  selecting a basis for the computation of exponential functions based on a part of the public key by the host and transmitting the basis to the TPM;
  computing a first contribution of the pseudonym based on the basis and the first parameter as exponents by the TPM and transmitting the first contribution to the host;
  computing a second contribution of the pseudonym based on the basis and the second parameter as exponents by the host; and
  computing the pseudonym based on a combination of the first and second contributions by the host and transmitting the pseudonym to the TPM.

5. The cryptographic method according to claim 3, wherein the step of conducting the second proof comprises proving that the host in combination with the TPM has knowledge of the first and second parameters.

6. The cryptographic method according to claim 3, further comprising the steps of:
  transmitting the authenticated pseudonym and the message from the host to an issuer;
  conducting a third proof, proving to the issuer that the authenticated pseudonym and the message were computed correctly;
  said issuer generating a certificate for the pseudonym attesting that the pseudonym was generated using a valid TPM and is endorsed by the issuer, if the issuer accepts the third proof and transmitting the certificate to the host; and
  decoding and storing a first part of the certificate by the host and decoding and storing of a second part of the certificate by the TPM.

7. The cryptographic method according to claim 6, wherein the step of conducting the third proof comprises:
  proving to the issuer that a valid endorsement key was used to authenticate the pseudonym; and proving that the host and TPM have knowledge of the first and second parameters used to generate the pseudonym and the message.

8. A cryptographic method for execution by a computer comprising a host computer system having at least one processing device and an associated trusted platform module (TPM) integrated into the host computer system comprising the steps of:
providing an anonymous attestation key comprising a first and second parameter, a first pseudonym and a certificate by an issuer, wherein at least the first parameter is stored inside the TPM and at least the second parameter is stored at the host computer system outside the TPM;
computing a second pseudonym for communication with a verifier based on the at least two parameters used for generating the first pseudonym for communication with the issuer;
computing a signature message based on at least a first signature parameter selected by the TPM and a second signature parameter selected by the host;
conducting a proof, proving to the host that a first contribution to the signature message, based on the first signature parameter was computed correctly by the TPM;
signing a message by computing a signature based on the second pseudonym and the signature message; and
making available the signature through the host, if the host accepts the proof.

9. The cryptographic method according to claim 8, wherein the step of computing the second pseudonym comprises:
selecting a basis for the computation of exponential functions by the host and transmitting the basis to the TPM;
said TPM computing a first contribution to the pseudonym based on the basis and the first parameter as exponents and transmitting the first contribution to the host;
said host computing a second contribution to the pseudonym based on the basis and the second parameter as exponents; and
said host computing the pseudonym based on a combination of the first and second contributions and transmitting the pseudonym to the TPM.

10. The cryptographic method according to claim 8 wherein the step of computing a signature message comprises:
computing a first signature part;
computing a challenge based on the first signature part; and
computing a second signature part based on the challenge.

11. The cryptographic method according to claim 10, wherein the step of computing the first signature part comprises:
said TPM computing a first contribution to the first signature part based on the first signature parameter as exponents and transmitting the first contribution to the host;
said host computing a second contribution to the first signature part based on the second signature parameter as exponents; and
said host computing the first signature part based on a combination of the first and second signature parts.

12. The cryptographic method according to claim 11, wherein the step of conducting the proof comprises the steps of:
providing a public key of the issuer to the host and the TPM; and
proving that the first contribution of the first signature part lies in a subgroup defined by at least a part of the public key of the issuer.

13. The cryptographic method according to claim 8, wherein the signature comprises values further comprising the steps of:
transmitting the signature and the message from the host to the verifier;
verifying the correctness of the signature with respect to the message;
accepting the message as a valid by the verifier, if the signature can be verified as correct;
proving to the verifier that the second pseudonym is based on the two secret parameters used for computing the first pseudonym; and
proving to the verifier that the host and the TPM have knowledge of the certificate on the first pseudonym.

14. A host computer system for secure communications, comprising:
a trusted platform module (TPM), the TPM comprising a first memory and a first processing unit;
a second processing unit outside the TPM; and
a second memory outside the TPM;
whereby
the first processing unit is configured to compute a first contribution to a message, the first contribution being based on a first secret parameter stored in the first memory unit;
the second processing unit is configured to compute a second contribution to the message, the second contribution being based on a second secret parameter stored in the second memory unit; and
at least one of the first and the second processing units is configured to combine the first and the second contribution to the message and to verify a proof by the other processing unit that its contribution was computed correctly.

15. The host system according to claim 14 being adapted to generate a first random number inside the TPM and a second random number outside the TPM, whereby the first and second numbers are used as the first and second secret parameters.

16. The host system according to claim 14 being adapted to generate an asymmetric key pair for at least one of encryption and authentication, whereby the message forms at least a part of a public part of the key and the first and second parameters form at least a part of the private part of the key.

17. A trusted platform module for integration into a host system, comprising:
a processing unit;
a memory; and
an interface to a host;
whereby the processing unit is adapted to:
compute a contribution to a message based on a parameter stored in the memory;
transmit the contribution via the interface to the host for combination with a second contribution based on a second parameter stored by the host system outside of the TPM; and
prove to the host that the contribution was computed correctly based on said combination.

18. The trusted platform module according to claim 17, wherein the processing unit is further adapted to:
compute a contribution to a pseudonym based on the parameter;
transmit the contribution via the interface to the host; and
request and verify a proof from the host that the contribution has contributed to a pseudonym received via the interface.

19. A computer program product comprising a non-transitory computer readable medium embodying program instructions executable by a host computer system having a trusted platform module (TPM) integrated into the host computer system to perform steps of:
- requesting a first contribution to a message from an associated trusted platform module (TPM);
- verifying that the first contribution was computed correctly by the TPM;
- computing a second contribution to the message by the host system, the second contribution being based on a secret parameter stored in the host system outside the TPM;
- combining the first and second contributions to the message; and
- making the message available if the verification of the first contribution was successful.

20. A computer program product according to claim 19, wherein the method further comprising:
- requesting a first contribution to a pseudonym from the TPM;
- computing a second contribution to the pseudonym based on the secret parameter chosen by the computer program;
- combining the first and second contributions to the pseudonym; and
- proving to the TPM that the first contribution has contributed to the pseudonym.

* * * * *